2,241,451

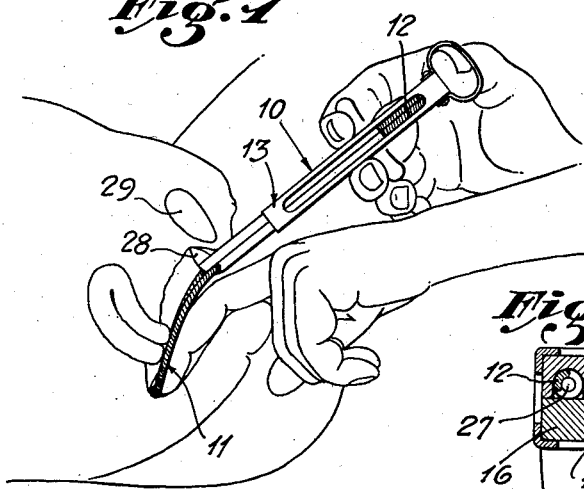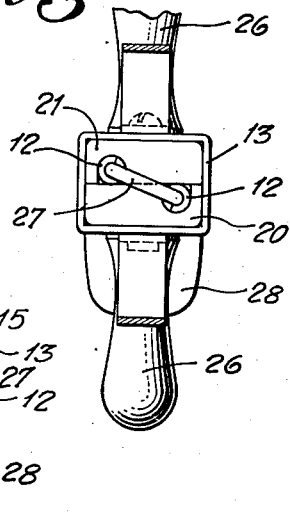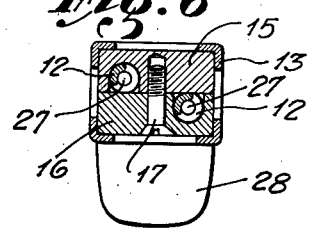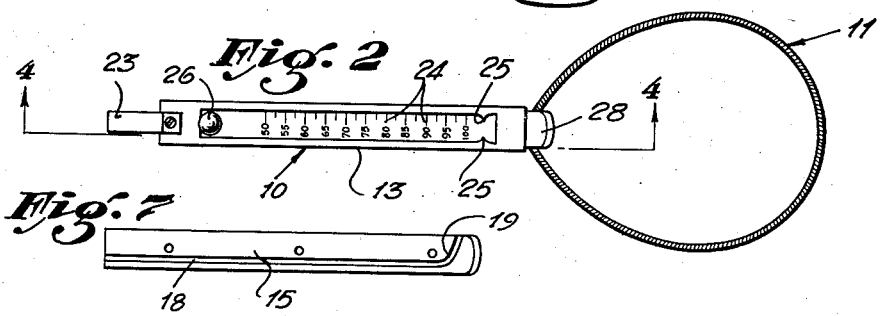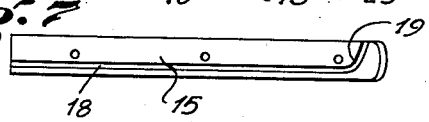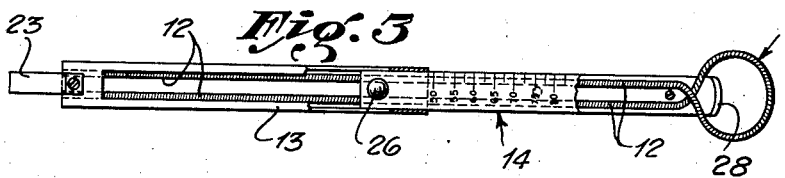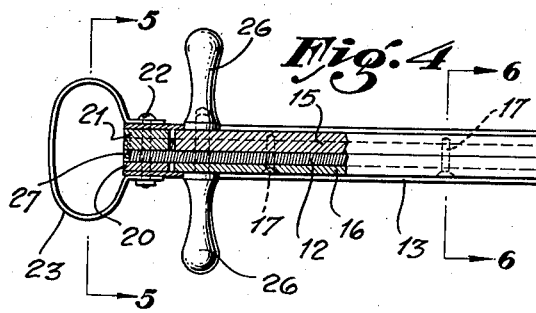
May 13, 1941. H. S. FIST 2,241,451
SURGICAL MEASURING INSTRUMENT
Filed June 19, 1940
INVENTOR:
Harry S. Fist Patented May 13, 1941

UNITED STATES PATENT OFFICE 2,241,451

SURGICAL MEASURING INSTRUMENT

Harry S. Fist, Los Angeles, Calif.

Application June 19, 1940, Serial No. 341,299

5 Claims. (Cl. 33—179)

This invention relates to devices for the measurement of the inside of the human vagina and particularly to an instrument provided with a flexible expanding loop, of material substantially circular in cross-section, which will remain in a more or less circular form and will measure the vaginal cavity, indicating the exact diameter of a flexible rubber diaphragm which will be adapted to fit that particular vaginal canal.

Heretofore, physicians have estimated vaginal size by the hit and miss method of trying various sizes of flexible rings or diaphragms, one after another, until the approximate fit was found. If the ring seemed too large or too small, there was no way to increase or decrease its size to obtain exact measurement.

The diaphragms used are normally round. The vagina is ovoid and presses the diaphragm into an oval shape. A measuring instrument to be efficient, must measure the oval vaginal space, giving the result in terms of diameter of a round pessary which will fit this vagina when pressed into the necessary oval form.

My device is simple, small, easily sterilized, with no sharp parts to injure tender tissues, adjustable to the shape of the vagina in the same manner as is a Mensinga type diaphragm and indicates the vaginal diameter on an external scale which is in view while the vagina is being measured.

In view of the disadvantages of the previous methods of measuring the vagina for fitting a pessary it is the primary object of this invention to provide a new instrument which measures accurately the diameter of the pessary required and uses for the measuring a flexible member similar in form and physical characteristics to the supporting portion of the rim of the pessary for which the measurement is made.

It is the particular object of this invention to provide a vaginal measuring device which is so constructed that, in measuring a vagina, the gloved finger of the operator is inserted to insure correct positioning of the device and determines whether the flexible loop is pressed too firmly against the vaginal mucosa or is too loose.

It is a further object of this invention to provide a vaginal measure, the outside circumference of which fits into the vagina and is held in the same position as would be occupied by a diaphragm, thus providing a means of determining the size of diaphragm which would fit this vagina.

It is the object of this invention to provide a vaginal measuring instrument which may be increased or decreased in size, causing it to fit the vagina while the finger of the examiner estimates the tension of the vaginal mucous membrane and thus eliminates laxity or overdistention at the time of measurement.

It is the further object of this invention to provide a vaginal measure which will measure the size of the cavity inside the vagina while at the same time the size may be read on the calibrated scale outside the vagina.

It is also an object of this invention to provide an instrument of the type indicated which may be used without danger of injury to the patient and may be readily sterilized.

These and other objects will be apparent from the drawing and the following description. Referring to the drawing, which is for illustrative purposes only:

Fig. 1 is a diagrammatic illustration of the female pelvic anatomy and a side elevation of a vaginal measuring instrument, according to my invention, inserted in the vagina in measuring position, with the operator's finger determining the position of the loop and the tension of the vagina;

Fig. 2 is a front elevation of the instrument shown in Fig. 1;

Fig. 3 is a back elevation of the instrument shown in Figs. 1 and 2, with the handle extended and a portion of the handle rod member broken away;

Fig. 4 is a sectional view taken on the line 4—4 of Fig. 2;

Fig. 5 is an enlarged end view taken on the line of 5—5 of Fig. 4;

Fig. 6 is an enlarged cross-section taken on the line 6—6 of Fig. 4; and

Fig. 7 is a view of the inner surface of a handle rod member.

In the drawing, the numeral 10 generally indicates the body or handle of the instrument, from one side of which there extends the loop 11 of a flexible member 12 formed of closely coiled spring wire. The body 10 comprises an outer shell 13, within which an elongated member 14, of generally rectangular shape in cross-section, is slidable. The member comprises a pair of rods 15 and 16, joined together throughout their length by screws 17, the adjacent surface of each of the rods having a longitudinal channel 18, (Fig. 7) formed therein. Toward one end, each of the channels is outwardly curved at 19, so that it emerges at the side of the rod. Since the inner surface of each of these rods is identical, when they are joined together the curved portions 19 of their channels cross. The flexible member 12 is slidably disposed in these channels and extends from opposite sides of the member 14 to form the loop 11, as is best seen in Fig. 3.

The ends of the flexible member are clamped between a pair of grooved blocks 20 and 21, secured in one end of the shell by a screw 22, a looped handle 23 also being held to the shell by this screw. It will thus be seen that, when the member 14 is reciprocated within the shell 13, the size of the loop 11 is alternately increased or decreased. To indicate the size of the projected loop, indicia 24 are provided, on the outer surface of the rod 16, with which a pair of pointers 25, formed on the edge of an apertured portion of the shell 13, cooperates. The indicia are so arranged that at any given setting, the diameter of the circle which has the same circumference as the loop, may be read directly in millimeters.

Finger-engageable members 26 are secured to the member 14 and extend through the apertured front and back walls of the shell 13, longitudinal movement of the member 14 in the shell being limited by the engagement of these members with the ends of the apertures. For stiffening the inner end portions of the flexible member 12 when these portions are not guided within the member 14, a U-shaped member 27, of stiff wire, is provided, the ends of which extend within the flexible member. Secured to the outer end of rod 16 is a projection 28, the purpose of which will be made clear in the following description of the instrument.

In operation the outer shell 13 of the handle is extended so that the loop 11 is as small as possible. Using the gloved finger as a guide, the end of the instrument is inserted in the vagina and the projection 28 is placed against the pubic bone 29.

Still using the gloved finger in the vagina as a guide, the extended outer shell of the handle 13 is brought closer to the inner portion 14 by pressing the thumb support toward the finger holders till the circular portion of the flexible member 12 just fits the vaginal cavity. By adjusting this back and forth slightly, an exact fit may be obtained and the size of the required diaphragm read off on the calibrated portion.

The instrument may be removed by bringing the projection out from under the pubic bone and allowing the loop 11 to remain the same size, or the outer shell may be pulled out to shrink the loop 11 and the instrument then removed. Care in manipulating the instrument will prevent any pain.

While I have herein described a specific embodiment of my invention, I wish it to be understood that modifications may be made without departing from the spirit of my invention, and that I intend therefore to be limited only by the scope of the appended claims.

I claim as my invention:

1. In a measuring instrument adapted for insertion in the human vagina, a handle, a flexible member projecting from one end of said handle in the form of a substantially circular loop, means cooperating with said handle for increasing or decreasing the size of said loop, and a projection formed on said one end of said handle for locating the instrument with respect to the pubic joint.

2. In a measuring instrument adapted for insertion in the human vagina, a handle, a flexible member projecting from one end of said handle in the form of a substantially circular loop, means cooperating with said handle for increasing or decreasing the size of said loop, and a projection formed on said one end of said handle so that its edge is continuous with the circumference of said loop.

3. In a measuring instrument of the character described, an elongated handle having a pair of longitudinal passages therethrough, said passages being curved in opposite directions at one end so that they emerge on opposite sides of the handle, a flexible member slidable in said passages and extending from the curved ends thereof in the form of a substantially circular loop, and means for moving the flexible member with respect to said handle to increase or decrease the size of said loop.

4. In a measuring instrument of the character described, an elongated handle having a pair of longitudinal passages therethrough, said passages adjacent one end of said handle being curved in opposite directions so that they emerge on opposite sides of the handle, a flexible member slidable in said passages and extending from the curved ends thereof in the form of a substantially circular loop, said flexible member being in the form of a length of closely coiled spring wire.

5. In an instrument of the character described, a handle comprising a pair of elongated members joined together throughout their length, the adjacent surface of each of said members having a longitudinal channel formed therein, said channels being curved in opposite directions adjacent one end of said handle so that they emerge on opposite sides thereof, a flexible member slidable in said channels and extending from the curved ends thereof in the form of a substantially circular loop, and a shell slidable on a portion of said handle and secured to the ends of said flexible member.

HARRY S. FIST.